Dec. 17, 1963  B. M. FINE  3,114,833
MULTICOLOR RADIOGRAPHY
Filed June 29, 1953  6 Sheets-Sheet 1
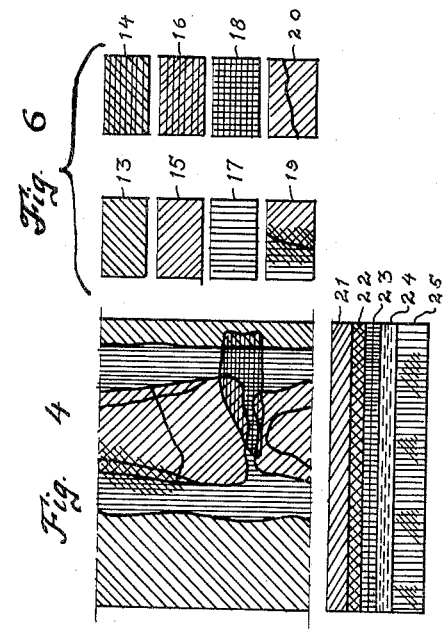
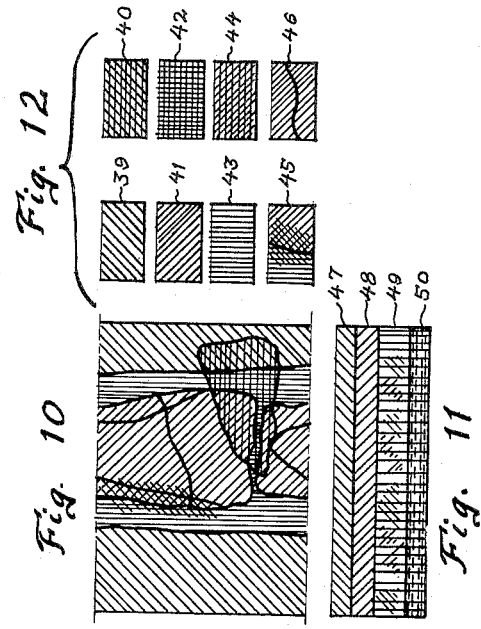
BY Bernard M. Fine
INVENTOR

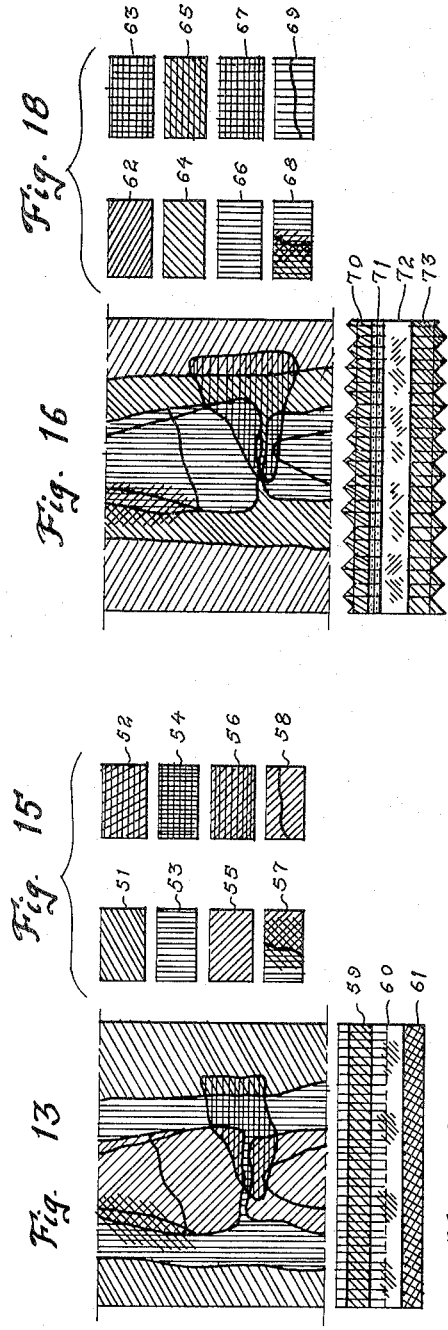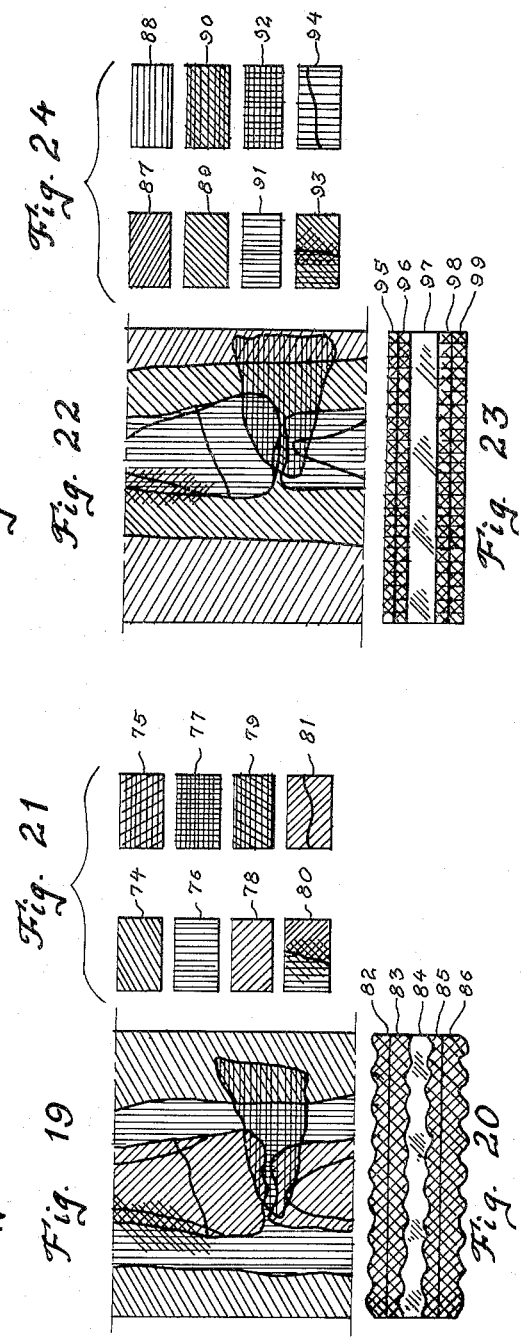

Dec. 17, 1963   B. M. FINE   3,114,833
MULTICOLOR RADIOGRAPHY
Filed June 29, 1953   6 Sheets-Sheet 3
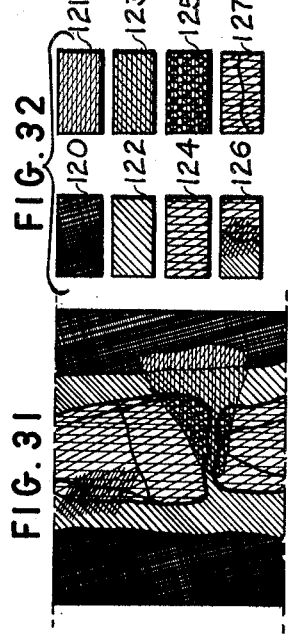
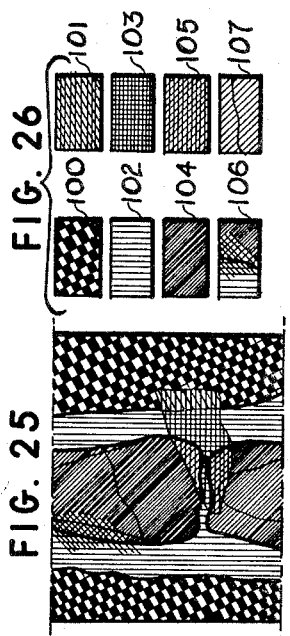
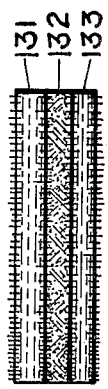
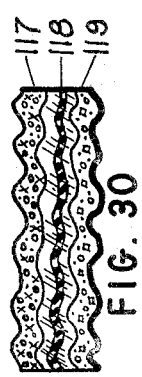
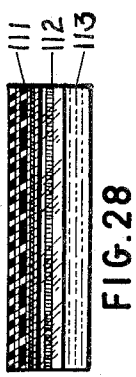
BY Bernard M. Fine
BERNARD M. FINE
INVENTOR Dec. 17, 1963  B. M. FINE  3,114,833
MULTICOLOR RADIOGRAPHY
Filed June 29, 1953  6 Sheets-Sheet 4
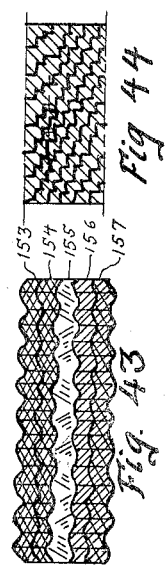

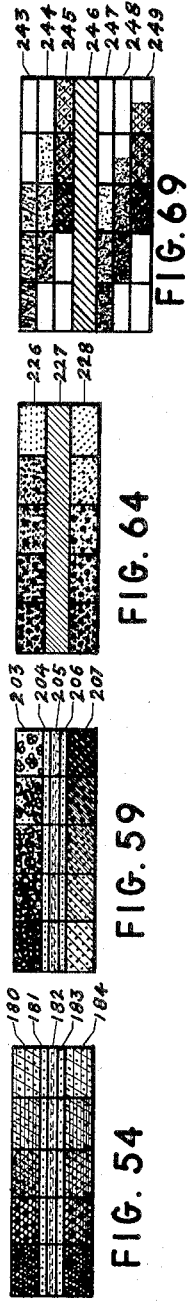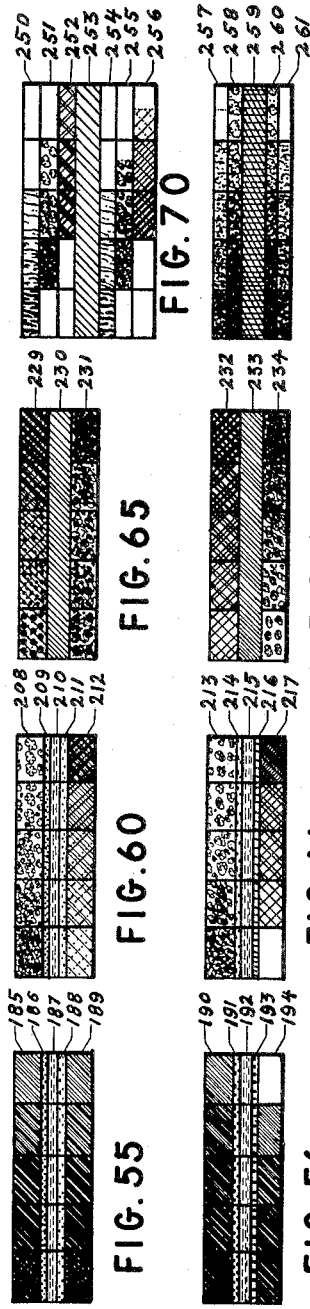

Dec. 17, 1963  B. M. FINE  3,114,833
MULTICOLOR RADIOGRAPHY
Filed June 29, 1953  6 Sheets-Sheet 6

BY Bernard M. Fine
Bernard M. Fine
Inventor

United States Patent Office 3,114,833
Patented Dec. 17, 1963

3,114,833
MULTICOLOR RADIOGRAPHY
Bernard M. Fine, Lynn, Mass. (437 Ottawa St. SE., Forest Heights, Washington 21, D.C.)
Filed June 29, 1953, Ser. No. 364,609
7 Claims. (Cl. 250—65)

This invention relates to multicolor radiography and is particularly concerned with the production of radiographs showing different color values, to instrumentalities enabling such multicolor radiographs to be produced, to the finished multicolor radiographs themselves, and to methods of producing such instrumentalities and their utilization.

Heretofore radiographs have been produced for use in both medicine and industry wherein the radiographs are obtained in tones of black and white, as for example, by the utilization of films in which the image is the result of development of silver halide e.g. silver bromide containing emulsions. Such radiographs in black and white suffer from a number of disadvantages. Frequently it is found particularly in the study of pathological conditions that there is no substantial registration of differences in structure being investigated in the resulting black and white radiograph which lack of difference may be due to a number of causes. A simple illustration is in the taking of radiographs of the human body in an attempt to locate or differentiate the presence of pieces, particles, or slivers of non-metallic glass. In many cases it is found that the ordinary radiograph produced in black and white shows no differentiation of such glass particles due to the fact that the image registered on the radiograph is of the same or similar intensity or density or both with respect to such glass particles, etc., as portions of the body with which they are in contact. In other instances where such glass particles, etc., are covered or hidden by some body materials such as bone, the glass may be indistinguishable in such radiograph taken by ordinary means. In other cases the differences registered on the film between the glass and the bone for example, are so small as to make the glass indistinguishable. In other cases differences which should show up in such black and white radiographs, for example, in connection with bone pathology are so weak on the usual type of radiograph that they are not readily apparent and are frequently overlooked.

An attempt has been made to overcome some of these difficulties in prior art radiographs by the use of a tinted or colored film support or base as in Patent No. 1,973,886 to Scanlan and Holzwarth. While some improvement is obtained by the utilization of a tinted base in this way with the otherwise produced radiograph in black and white, the improvement is of minor character and does not extend to an elimination of the difficulties and disadvantages frequently experienced in such prior art radiographs, some of which have been referred to above.

Among the objects of the present invention is the production of multicolor radiographs in which the colors are in the range from violet to red of the visible spectrum, whereby due to the multicolor effects obtained, it is possible to differentiate structural differences by such radiographs which is not possible with the prior art types of black and white radiographs with or without tinted bases or films.

Other objects of the invention include the application of a variety of the instrumentalities and procedures of color photography in the production of multicolor radiographs.

Still further objects include improved instrumentalities for the production of multicolor radiographs as well as improved, modified, and entirely new techniques in their production.

Still further objects and advantages of the present invention will appear from the more detailed description set forth below, it being understood, however, that such more detailed description is given by way of illustration and explanation only, and not by way of limitation, since various changes therein may be made by those skilled in the art without departing from the scope and spirit of the present invention.

In connection with that more detailed description, there is shown in the accompanying drawings, a series of illustrations of radiographs having multicolor values produced in accordance with the present invention, each illustration including a series of figures illustrating differences in effects obtained by differences in instrumentalities and techniques, as follows:

FIGURE 1 is a plan view of a developed color film after X-ray exposure;

FIGURE 2 is a section of the film of the preceding film, prior to exposure;

FIGURE 3 is a group of legends explanatory of the two immediately preceding figures;

FIGURE 4 is a plan view of a modified color film after X-ray exposure and development;

FIGURE 5 is a section of the film of the preceding figure, prior to exposure;

FIGURE 6 is a group of legends explanatory of the two immediately preceding figures;

FIGURE 7 is a plan view of a further modified color film after X-ray exposure and development;

FIGURE 8 is a section of the film of the preceding film prior to exposure;

FIGURE 9 is a group of legends explanatory of the two immediately preceding figures;

FIGURE 10 is a plan view of a further modified color film after X-ray exposure and development;

FIGURE 11 is a section of the film of the preceding film prior to exposure;

FIGURE 12 is a group of legends explanatory of the two immediately preceding figures;

FIGURE 13 is a plan view of a further modified color film after X-ray exposure and development;

FIGURE 14 is a section of the film of the preceding film, prior to exposure;

FIGURE 15 is a group of legends explanatory of the two immediately preceding figures;

FIGURE 16 is a plan view of a further modified color film after X-ray exposure and development;

FIGURE 17 is a section of the film of the preceding film, prior to exposure;

FIGURE 18 is a group of legends explanatory of the two immediately preceding figures;

FIGURE 19 is a plan view of a further modified color film after X-ray exposure and development;

FIGURE 20 is a section of the film of the preceding film, prior to exposure;

FIGURE 21 is a group of legends explanatory of the two immediately preceding figures;

FIGURE 22 is a plan view of a further modified color film after X-ray exposure and development;

FIGURE 23 is a section of the film of the preceding film, prior to exposure;

FIGURE 24 is a group of legends explanatory of the two immediately preceding figures;

FIGURE 25 is a plan view of a further modified multicolor radiograph after X-ray exposure and development;

FIGURE 26 is a group of legends explanatory of the immediately preceding figure;

FIGURE 27 is a section of the film, illustrated by FIGURE 25, prior to exposure;

FIGURE 28 is a section of another film, illustrated by FIGURE 25, prior to exposure;

FIGURE 29 is a section of a modified film, illustrated by FIGURE 25, prior to exposure;

FIGURE 30 is a section of a further modified film, illustrated by FIGURE 25, prior to exposure;

FIGURE 31 is a plan view of a further modified color radiograph after X-ray exposure and development;

FIGURE 32 is a group of legends explanatory of the immediately preceding figure;

FIGURE 33 is a section of the film, illustrated in FIGURE 31, prior to exposure;

FIGURE 34 is a section of a modified film, illustrated by FIGURE 31, prior to exposure;

FIGURE 35 is a section of a further modified film, illustrated by FIGURE 31, prior to exposure;

FIGURE 36 is a section of a further modified film, illustrated by FIGURE 31, prior to exposure;

FIGURE 37 is a section of the film of FIGURE 25 prior to exposure, that has been modified by the inclusion of several diaphragms within the film structure;

FIGURE 38 is a plan view for a portion of each of the diaphragms used in the immediately preceding figure;

FIGURE 39 is a section of a film prior to exposure modified by the inclusion of a grid within the film structure;

FIGURE 40 is a plan view for a portion of the grid used in the immediately preceding figure;

FIGURE 41 is a section of a further modified film, prior to exposure, that has included within its structure a baffle;

FIGURE 42 is a plan view of a portion of the baffle used in the immediately preceding figure;

FIGURE 43 is a section of unexposed film modified by inclusion of two diaphragms;

FIGURE 44 is a plan view for a portion of each of the diaphragms used in the immediately preceding figure;

FIGURE 45 is a section of the film of FIGURE 31 prior to exposure, modified by inclusion of a diaphragm within the film structure;

FIGURE 46 is a plan view for a portion of the diaphragm used in the immediately preceding figure;

FIGURE 47 is a section of a film, prior to exposure, modified by the inclusion of two grids within the film structure;

FIGURE 48 is a plan view of a portion of one of the grids used in the immediately preceding figure;

FIGURE 48 is a section of a film, prior to exposure, modified by inclusion of a baffle;

FIGURE 50 is a plan view of a portion of the baffle used in the immediately preceding figure;

FIGURE 51 is a section of unexposed film modified by inclusion of two baffles within its structure;

FIGURE 52 is a plan view of a portion of each of the baffles used in the immediately preceding figure;

FIGURE 53 is a densitometric wedge caused by variations in the amount and wave lengths of X-radiation affecting the X-ray sensitive silver halides in a film for color radiography;

FIGURE 54 illustrates the formation of color in direct proportion to the amount of silver halides affected, in a film having a base of one color and emulsions capable of producing a contrasting color with masking layers included;

FIGURE 55 illustrates the film described in FIGURE 54 with the silver halides removed from the colored images in the emulsions;

FIGURE 56 illustrates a film with an upper emulsion that is sensitive proportionally to all the radiation transmitted and a lower emulsion that is more sensitive to a portion of the radiation transmitted;

FIGURE 57 illustrates a film with a lower emulsion that produces a different color from that of the upper emulsion;

FIGURE 58 is a densitometric wedge caused by modifications in the amounts of wave lengths of X-radiation affecting the X-ray sensitive silver halides in a film color radiography;

FIGURE 59 illustrates a film that has a non-reversible emulsion on one side, and a reversible emulsion on the other side;

FIGURE 60 illustrates the film described in FIGURE 59 with the silver halides removed and the vari-colored images remaining in the emulsions;

FIGURE 61 illustrates a film that produces multi-colored images with an upper non-reversible emulsion that does not respond to the longer radiations, and a lower reversible emulsion that responds strongly to a proportion of all the radiations;

Figure 73:
Figure 74:
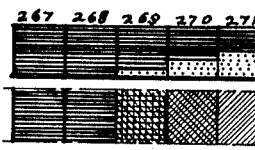
Figure 77:
Figure 80:
Figure 75:
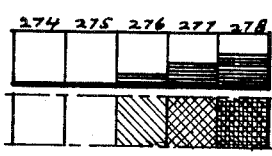
Figure 78:
Figure 81:
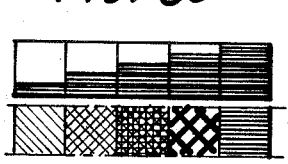
Figure 76:
Figure 79:
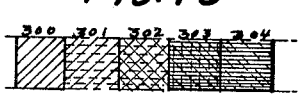
Figure 82:
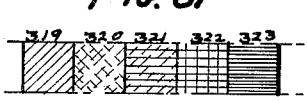
Figure 83:
Figure 84:
Figure 87:
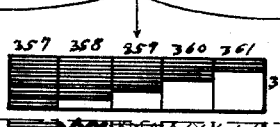
Figure 90:
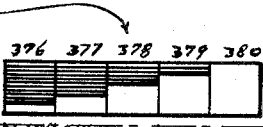
Figure 85:
Figure 88:
Figure 91:
Figure 86:
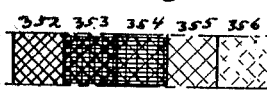
Figure 89:
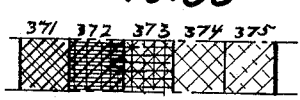
Figure 92:
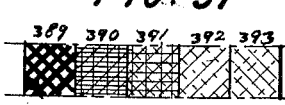

FIGURE 62 illustrates a further modified multi-color film for radiography that has an upper non-reversible emulsion that responds only to the softer radiations, and a lower reversible emulsion that responds strongly to all the radiations, especially the softer radiations so that little or no colored image remains in the lower emulsion where it is affected by softer radiations when this emulsion is reversed;

FIGURE 63 is a densitometric wedge caused by variations and modifications in the amounts and intensities of wave lengths of X-radiations affecting the X-ray sensitive emulsions in a film for color radiography;

FIGURE 64 illustrates the amount of silver halides affected by the radiation, in FIGURE 63, in a film that has both emulsions reversible;

FIGURE 65 illustrates the formation of a different color in each emulsion of the film in FIGURE 64 in contra-proportion to the amounts of silver halide affected;

FIGURE 66 illustrates the film of FIGURE 65 with the silver halides removed and the differently colored emulsion images remaining;

FIGURE 67 illustrates a film 65, with an upper emulsion that is not sensitive to the longer X-radiations, and a lower emulsion that is sensitive to all the radiations with a very high sensitivity to the softer radiations;

FIGURE 68 is a densitometric wedge caused by difference in the amounts and intensities of wave lengths of X-radiations affecting the X-ray sensitive emulsions in a film for color radiography;

FIGURE 69 illustrates a monopack type multi-color radiography film without filter or absorbing layers of any kind;

FIGURE 70 illustrates the film described in the immediately preceding figure with the silver halides removed and the variously colored images remaining in the emulsion layers;

FIGURE 71 illustrates a monopack multicolor radiography film that has two layers on each side of the film base that are reversible, and develop one color for the inner emulsion layer and a complementary color in the outer emulsion layer, each layer showing a predominant sensitivity to opposing portion of the X-ray spectrum;

FIGURE 72 illustrates the same film described in FIGURE 71 but with the silver halides removed and the final reversed images in color remaining;

FIGURE 73 illustrates a densitometric wedge in relation to the density of a subject through which the range and intensities of the various wave lengths of X-radiation must pass;

FIGURE 74 illustrates the intensity of the color formed in proportion to the amount of silver halide affected by the radiation in a non-reversible emulsion;

FIGURE 75 illustrates the intensity of the color formed in the areas of silver halide not affected by the radiation in a reversible emulsion on the same film base bearing the emulsion as in FIGURE 74 when both emulsions have an equal sensitivity to the radiation;

FIGURE 76 illustrates the different color values in the final multi-color radiograph caused by the contrasting colors of the emulsions represented in FIGURES 74 and 75;

FIGURE 77 illustrates a non-reversible emulsion of one film that has been X-ray modified and developed to produce one color in proportion to the amount of silver halide affected; the color intensity being shown by the densitometric wedge for this film;

FIGURE 78 illustrates a reversible emulsion on the same film base that carries the emulsion represented in FIGURE 77, but develops a contrasting color;

FIGURE 79 illustrates the differently colored images in the final multi-color radiograph;

FIGURE 80 illustrates a further X-ray modified emulsion of the non-reversible type;

FIGURE 81 illustrates a reversible emulsion of equal sensitivity to, and on the same film base that carries the emulsion represented in FIGURE 80;

FIGURE 82 illustrates the differently contrasting color images;

FIGURES 83 illustrates a densitometric wedge in relation to the density of a subject through which the range and intensities of the various wave length of X-radiation must pass and therefor be modified accordingly;

FIGURE 84 illustrates a highly X-ray sensitive non-reversible emulsion and the various intensities of one color that is formed in proportion to the amount of silver halide that has been affected by exposure to X-radiation;

FIGURE 85 illustrates an X-ray sensitive non-reversible emulsion;

FIGURE 86 illustrates the various colors and color values of the multi-color radiograph that results from placing the emulsions represented by FIGURES 84 and 85 on opposite sides of a clear and colorless film base;

FIGURES 87 illustrates a non-reversible emulsion that develops one color but has a predominant range of sensitivity to the softer X-rays;

FIGURES 88 illustrates a non-reversible emulsion that has a range of sensitivity toward the harder X-rays;

FIGURE 89 illustrates the final multi-colored images that result from a film carrying emulsions of FIGURES 87 and 88 on a differently colored transparent film base;

FIGURE 90 illustrates a non-reversible film emulsion of one color that has a moderate reaction of the portions of the X-ray spectrum with the greater amounts of radiation being transmitted;

FIGURE 91 illustrates a non-reversible film emulsion with a more uniform sensitivity to the range of the X-ray spectrum; and FIGURE 92 illustrates the multi-color radiograph with emulsions on a film base of a uniform color tint.

In accordance with the present invention radiographs are obtained having a developed-color image, particularly multi-color radiographs are produced in which the colors fall in the range from violet to red of the visible spectrum. Thus the term color as used here is employed in its true sense differentiating from black, white and gray. The term color is, however, employed to include any variation in color value. Thus two or more colors may be present in the finished multicolor radiograph, which colors are either entirely different in character, that is fundamentally different colors which contrast with one another, or are variations in color values of the same or different colors, or are complementary colors or variations in complementary color values, or any combinations of such effects. The term color value will, therefore, be used herein to cover multicolor effects whether the colors are contrasting, complementary, or mere variations in shade or tone of the same color but sufficient to show the differentiation desired in the radiograph.

The radiant energy employed in producing radiographs in accordance with the present invention may be X-rays, gamma rays, or other portions or combinations of the electro-magnetic spectrum that are not visible to the human eye. The invention will be particularly illustrated by the use of X-rays and radiographs produced by X-rays are hereinafter denominated exographs while those produced by utilization of gamma rays will be referred to specifically as gammagraphs. As stated above, the invention will be particularly explained and illustrated below by the use of X-rays since the technique of making exographs is very well developed and any of the techniques and procedures employed in the prior art production of X-ray films of the black and white or black and gray type may be utilized in the present invention in the production of radiographs of multicolor character.

The invention also includes the use of various ionizing particles such as alpha particles, beta particles, protons, mesons, and neutrons. Also by adding boron ($B^{10}$) to the emulsion, neutrons can also be utilized. Other analogous additions can be made for utilization of non-ionizing particles because of the ionization produced by secondary particles. Both interaction and recoil procedures can be used. The boron isotope ($B^{10}$) desired may be that normally present in the boron compound added to the emulsion or an enriched source of $B^{10}$ compound can be used. The term charged particle may be used to cover certain of the effective rays employed in the present invention. However, more generally the term subatomic particle may be used to cover any of the particles mentioned above and together with electromagnetic waves having a wave length outside the visual spectrum, will cover the various energy sources that can be employed as distinct from visual light.

In accordance with the present invention, instead of using prior art types of X-ray films in the production of radiographs, the present invention utilizes plates, films, etc., in which a multicolor effect is obtained in the finished radiograph. Accordingly utilization may be made in the present invention of the instrumentalities, techniques and procedures of color photography applied, however, to the production of multicolor radiographs. In this connection it should be pointed out that in the present invention there is no attempt made to reproduce in color corresponding with the natural color of the object or material of which the radiograph is taken. What is sought is a radiograph showing structural differentiation of the article or material by means of color values which need have no relation whatsoever to the true or natural color of the object or material being "X-rayed," the color differentiation being employed entirely for the purpose of differentiating structural features of the object or material of which the radiograph is taken. Consequently the present invention is not concerned with the techniques of color photography from the standpoint of reproducing in natural color the subject of which the radiograph is taken, but employs the instrumentalities, techniques and procedures of color photography in the production of radiographs in multicolor effects in no way necessarily related to the true or natural color of the subject. For this reason it may be said that the color shown on the radiograph is unnatural in the present invention. While, therefore, the techniques and procedures and instrumentalities of color photography may be readily employed in carrying out the present invention for the purposes in hand, it becomes possible because of the differentiation pointed out above, that is, because no attempt is made to reproduce in its natural color the subject of which the radiograph is taken (although in some cases this may be done), to employ instrumentalities, techniques and procedures which result in a multicolor radiograph by simplification of such instrumentalities, techniques and procedures of normal color photography. This will be further explained and illustrated below.

Thus the method of the present invention includes exposure of a ray sensitive photographic film or plate to nonvisible radiant energy such as X-rays, gamma rays, etc,. and the production from such ray exposed film of a multicolor radiograph, the colors being those in the range from violet to red of the visible spectrum. The term "photographic lamination" is used herein to cover photographic films, plates, etc. The photographic lamination used herein for the production of a radiograph having a developed color radiographic image includes a lamination or layer having a silver halide emulsion containing a color producing material in the emulsion. While it is possible to use color films now available on the market for producing color radiographs, including such commercial products as for example "Kodachrome," "Kodacolor," "Ektachrome," "Ansco Color," "Agfacolor," "Agfa Printon," "Dufay," "Gaspar," etc., as well as the utilization of silver-dye-bleach processes, etc., and to obtain acceptable results with those commercial products even though they are not specifically designed for use with X-ray or other non-visible radiant energy, markedly different results are obtainable with photographic entities particularly made for use with the present invention. Such latter specially desirable photographic entities include X-ray films of the type available on the market but having emulsions modified to contain a color producing material so that upon exposure to the non-visible radiant energy, and development, a radiograph is obtained showing color differentiation of ray delineated structural features. Also films and plates of the type manufactured for tracking alpha rays, beta rays, gamma rays, neutrons, mesons, protons, electrons, etc. may be used if modified however to include a color producing material in the emulsion. The silver halide emulsions employed are therefore desirably those containing fine grain silver halides such as silver bromide, the grain size being such as to adapt such emulsions to use herein when the emulsions include the color producing materials. Such emulsions have silver halides of a grain size that adapts them peculiarly to use with X-rays and other non-visible radiant energy are characterized herein as "ray-sensitive-grain-size silver halide emulsions" and are to be sharply distinguished from the silver halide emulsions used for normal photographic work with visible light. The fine grain size may vary substantially as long as it is always fine enough to be peculiarly adapted to use with ray energy outside the visible spectrum. An upper limit of grain size for most desirable results with X-ray and other non-visible radiant energy, etc. as disclosed here is about $10^{-4}$ cm. Any lesser particle size is usable. A particle size range for use is exemplified as from about $1.3 \times 10^{-6}$ cm. to about $5.5 \times 10^{-5}$ cm., as for example silver bromide of about $2 \times 10^{-5}$ cm. particle size. Also it is desirable to use emulsions which contain at least about twice as much silver halide per dry weight of emulsion as is usually present in conventional photographic films. For example for present purposes a desirable range of the silver halide such as silver bromide may be from about 35% to 85% or even more on the dry weight of the emulsions, containing also the color producing material. Thus specially valuable films useful for the invention herein therefore may have silver bromide emulsions with a bromide particle size exemplified by from about $1.3 \times 10^{-6}$ cm. to $5.5 \times 10^{-5}$ cm. specifically $2 \times 10^{-5}$ cm. and such bromide desirably may constitute from 35 to 85% or more on the dry weight of the emulsion.

The desired film, plate or other photographic lamination of the size desired may be placed in a cassette or other protective casing which casing is impervious to visible radiant energy but permits X-rays, gamma rays, or other portions of the nonvisible electromagnetic spectrum to penetrate and affect the emulsion. The film may thus be put up in the same form as present X-ray films are available employing for example, a cardboard or bakelite and metal, or plastic cassette or casing but in which the film includes color producing elements in the emulsion or is available for development of multicolor effects in the emulsion by color photographic methods. Such cassettes in which commercial color film now available on the market can be placed, may then be utilized in lieu of the black and white type films employed for the production of radiographs but employing the techniques and procedures of making such radiographs as are heretofore employed in the prior art. After exposure for example, to X-rays by such usual radiograph technique, the exposed films may then be subjected to color development. While the above materials and procedures make it possible to utilize the present invention effectively in the production of multicolor radiographs by the employment of instrumentalities, techniques and procedures readily available in the art, it should again be noted that because the present invention is not concerned with the reproduction of the colors of the object or material of which the radiograph is taken, but is concerned with the production of multicolor values in radiographs to illustrate and differentiate structural features of the object or material, there is no limitation on either the materials, instrumentalities, techniques or procedures employed in the present invention which are restrictions on the reproduction of natural color photographs. As a result it becomes possible to simplify the instrumentalities, the techniques, and the procedures, enormously, since all that is necessary is to produce a radiograph in which there are differentiation in color values resultant from differences in structure in the object or material of which the radiograph is taken. Thus instead of employing a film which utilizes three color layers or three layers each of which develops its particular color effect so that by either addition or subtraction, natural color effect is produced, it becomes possible in accordance with the present invention to use two layers which produce a differentiated color value in the ultimate radiograph without concern as to reproduction of the color of any portion of the object or material of which the radiograph is taken. It is only necessary that it be possible in the radiograph to produce a multicolor effect in which there is color value differentiation in accordance with structural differences in the article or material "X-rayed." In the same way the techniques and procedures for the development of the color in the radiograph may be enormously simplified from those required in the production of natural color photographs. Even in connection with the commercially available color films that may be employed as explained above, the development procedures utilized in the production of multicolor radiographs from the exposed film, need not be the complex development procedures required in natural color photography, but the development procedures may be reduced materially both with respect to the solution treatments involved as well as the time element and steps employed since again it is only necessary to point out that the radiograph produced in accordance with the present invention requires merely that there be color value differentiation in such radiograph in accordance with structural detail of the object or objects or material or materials being viewed.

To illustrate some variations from conventional color type film on the market for normal color photography, the following is exemplary. The photographic lamination may include a single layer of ray-responsive-grain-size silver halide emulsion containing a color producing material since when exposed and developed with a silver halide and color developer, different tonal effects in color will be obtained. Or subtractive etc. color effects may be obtained by use of photographic laminations containing at least two ray-responsive-grain-size silver halide emulsions, one emulsion containing a color forming component different from that in the other emulsion. Or the lamination may include at least one ray-sensitive-grain-size silver halide emulsion containing a color producing material, and a layer providing a color value different from that of the emulsion for example such layer having a permanent tint present in the layer before development of the film or other lamination, which color will accentuate or contrast or otherwise differentiate the ray delineated color image.

The resulting multicolor radiographs produced in accordance with the present invention are new entities of great importance in medicine, dentistry, industrial application etc. The radiographs obtained may be generally characterized as having a gelatin or other layer carrying a color-developed fine grain silver or other image. There may as pointed out above be a multicolor developed image showing color differentiation of ray delineated structural features. Where two or more developed color images are present, subtractive color images may be produced. Or at least one color developed image may be present with a permanently tinted layer of color contrasting with that of the emulsion. Luminescent e.g. fluorescent etc. materials may be incorporated for special purposes. A variety of finished radiographs will be illustrated below.

To illustrate various features of the invention, the examples given below will refer to the utilization of color films and the results obtained with them. Radiographs produced from such commercially available color films in accordance with the present invention have demonstrated beyond any question that such films may be used for making X-ray photographs, radiographs, etc., in which two or more color values are present to differentiate structural features. The results so obtained are far superior to those obtained with prior art types of X-ray black and white films now on the market and in use for radiographic purposes including such films which carry a tinted base. The differentiation is so marked that in some cases at least diagnosis may be made with the multicolor radiograph which is not possible with the prior art X-ray black and white radiographs. In all of these following examples, the color film was utilized by being cut to the required size and enclosed in a cardboard cassette to protect it from visible light but in which cassette the film was available for radiographic purposes.

(A)

Ansco Color Film (daylight type) was exposed in a cardboard cassette using a human hand as the object. Exposures were made at varying time intervals of from one second to 12 seconds using 65 kilovolts and 10 milliamperes. Development was carried out with the "Ansco" kit. The resulting radiograph appeared in browns and yellows of such sharp contrast and such clear detail that the resultant radiograph was far superior to any of the black and white films now on the market. (The brown being formed by a response of three differently colored emulsions.) Exposure at one second was not considered satisfactory because it was not sufficiently clear and was rather weak in detail. Exposure at 12 seconds gave a slightly fogged effect due to overexposure. The intermediate exposures from 2 to 11 seconds were well balanced in various intensities and gave easily readable radiographs. It may be noted that the longer exposure showed greater detail in the bone while the shorter exposures showed better detail in flesh. The results set forth above were obtained without the use of any fluorescent screen during exposure to the X-rays. (Ansco Color Film, tungsten type, produced slightly different color values but with favorable results.)

Utilizing one of the types of the fluorescent screen commonly employed in making X-ray radiographs it was found that the color values in the film changed radically. Thus using the standard X-ray fluorescent screen with an exposure of 3 seconds under the conditions otherwise set forth above, it was found that the color results obtained on the film were in blue and red and magenta. The results can be varied and the color combinations also varied by using different fluorescent screens that fluoresce in different colors because of a difference in the chemical composition; thus permitting the selection of a fluorescent screen in accordance with the film being used and the results desired.

In this example as in the following examples, the conditions of exposure involved the use of 65 kilovolts and 10 milliamperes for the time specified. However, both the kilovoltage and milliamperage may be varied. It was found that change in the kilovoltage alone maintaining the constant of 10 milliamperes varied the colors slightly, while a variance in both kilovoltage and milliamperage gave marked changes in color values. Voltage as high as 100 kilovolts and amperage of 30 milliamperes may be used and even higher values, but it is unlikely that body radiology will require such high effect. In some cases in commercial and industrial work such higher ranges may be desirable. Variation in kilovoltage and milliamperage may also be employed in connection with material reduction in exposure time, and for example, using 75 kilovolts and 15 milliamperes it was found that the exposure time could be cut in half as compared with exposures employed under the conditions set forth in the examples. Variations in these factors including variation in kilovoltage, milliamperage, and exposure time will frequently result in substantial variation in the color values which result.

(B)

In this case "Kodak Ektachrome" film was employed in a cardboard cassette and results substantially the same as those obtained with Ansco color film set forth above were obtained. The Ektachrome film was exposed to X-ray without the use of a fluorescent screen and at 3 seconds for example, gave excellent results. At 2 seconds with the use of a fluorescent screen, it also gave excellent results comparable to those described above for "Ansco Color" film (daylight type), in Example A. The Ektrachrome film was developed by using a standard Ektrachrome kit available on the market and is quite similar to the Ansco development technique.

To exemplify the differentiation of the present invention from attempts to reproduce color films or photographs of the usual type, it may be noted that it was found that the time in the development baths could be shortened in the procedures utilizing the Ektrachrome development outfit, or varied to correct for under-exposure or over-exposure, however, it should be noted that changes in developing time may also vary the colors and color values and contrast, which may be desirable.

Other commercially available color films such as "Kodachorme," "Kodacolor," "Gaspar" color, "Dufay" color, "Autochrome," etc., may also be used in accordance with the present invention in the production of color radiographs.

It has been found that the processing time may be reduced in development for example of the "Ansco" and "Kodak" color films. For example use of wetting agents and of solutions slightly more concentrated than normally suggested with the manufacturer's processing kits, results in more rapid development and processing. It was also found that hypersensitization and intensification techniques may be used to increase the sensitivity and response of multicolor emulsions to X-rays, and it was found that in this way exposure and/or processing time could be shortened further, but with some resultant change in colors and color values that at times produced radiographs in colors or hues of greater contrast. While hypersensitization and intensification of for example multi-layer multi-color films of the type mentioned above usually rendered them valueless for normal color rendition by visual light, such treatments tended to increase their value for multi-color radiographs. The hypersensitizing and intensifying components may be incorporated in the emulsions and/or processing solutions, and may be used in conjunction with the color forming elements. One of the aims of the invention is to increase color intensity and contrast by the use of transparent colored, semi-opaque, and/or semi-transparent colored emulsions in the finished multi-color radiograph.

It should further be noted that the transparency or semi-transparency of the colored or multi-colored emulsion permits an opportunity to determine detail by variation of color, color hue or value, and/or color intensity where normally dark greys or shadows in the standard black and white type films would be difficult to analyze because of their opacity to the light by which the radiograph is being read. The colored or multi-color radiographic film further provides the radiologist a greater range for simplified reading of radiographs by permitting a greater variation of the reading light source, either in intensity and/or color to provide greater color contrast in the multi-color radiograph by the addition of subtractive synthesis of colored light intensity. Where such multi-colored radiographs are read by projection, additional multicolor variations can be obtained by additive or subtractive synthesis of light or colored filters, further varying the multi-colors, color value, and color contrast or hue already existing in the multicolor radiograph.

The drawings illustrate film structure, emulsion, and results obtained in color radiography producing exographs in multi-color effects. FIGURES 1–24 inclusive represent cross-sections through the film, illustrating the film (1) before exposure (2) with the final results in the developed and finished color radiograph above it showing, for example, a finger with glass intrusion and infection. Also accompanying each figure is a series of legends identifying particular film structure, emulsion layers and supports, images and color values.

Referring to FIGURES 1–3, this group of figures shows the utilization of three color emulsions in the film. Referring particularly to FIGURE 2, the film before exposure is shown in cross section illustrating an upper emulsion 9 which will develop to a blue-green or cyan. The intermediate emulsion 10 will develop to a magenta while the innermost emulsion 11 will be one that develops to a yellow. The film base 12 is clear and colorless in this particular instance.

As illustrated in FIGURE 1, after exposure and development with reversal in development, exposure being of the character set forth above in the examples describing the use of color film in the production of color radiographs and as identified in FIGURE 3, the background 1 where no finger bone is shown, is a yellow. The glass 2 in the flesh portion, due to the resultant emulsion referred to above, shows a color tan. The flesh 3 appears also as a tan color but different in value, being lighter, from that of the tan color showing the glass, the latter being much more emphasized. In this particular instance the flesh appears as a substantially lighter tan at 3 than that of the glass in the flesh at 2. The glass appearing through the bone is shown at 4 and may be described as a half-tone or full tone of brown, darker or slightly darker than the bone itself at 6. The glass by itself in the background is shown at 5 and will appear as a tan color value against the yellow. That is, it is separated from the background yellow by a slight tint of brown making it a tan. At 6 the outline of the bone will appear brown. An infection 7 between the flesh and the bone which appears as a lighter brown area showing a slightly different color in the bone due to the fact that the film used in this instance is a reversible film and the area at this point has been reversed, 7 showing also a slightly different color value in the flesh where the flesh is tan. A break 8 in the bone appears against the brown of the bone in a light tan color value making a clear definition of the break with the contrast of the almost yellow light tan to a dark brown.

Referring to FIGURES 4–6 of the drawing, this represents the standard color films now on the market having multi-emulsion layers for each color. The film as shown in cross section in FIGURE 5 before exposure, illustrates emulsions 21, 22 and 24 as now used on any standard color film, for example "Ansco" or "Kodak" while 23 is a masking layer to add chromacity or density to the film. The film base 25 in this instance is clear and colorless. The resultant radiograph after exposure to X-rays and development is as follows. As shown in FIGURE 4 with accompanying legend in FIGURE 6, the background 13 appears bright yellow, the bone 15 as dark brown, the flesh at 17 as tan, and the area of infection 19 appears in the bone as a lighter brown and in the flesh as a lighter tan. This is due to the fact that the infection has broken down the structure of the cells and permits greater passage of the rays. Reversing the film would result in this area appearing lighter. The glass is shown at 14 and appears as a tan color value against the background of yellow. At 16 the glass appears against the bone as a darker brown than the brown of the bone shown at 15. At 18 the glass within the flesh is shown as a darker tan almost brown than the color of the flesh at 17. The break 20 in the bone appears as a tan line defining the break very clearly against the brown of the bone. The masking layer 23 adds density to the color values, permitting even greater contrast in light transmission by some added limitation of the light used for viewing the film.

The use of certain types of fluorescent intensifying screens for the exposures and emulsions shown in FIGURES 1 and 4 would change the resultant color values to those listed below.

| Description | Figure 1 | Figure 4 | Color Value |
| --- | --- | --- | --- |
| Background | (section) 1 | (section) 13 | blue. |
| Flesh | (section) 3 | (section) 17 | (against background) light magenta. |
| Glass against background | (section) 5 | (section) 14 | (against background) light magenta. |
| Glass against: Flesh | (section) 2 | (section) 18 | magenta. |
| Bone | (section) 6 | (section) 15 | dark red with slight tinge of magenta. |
| Glass against bone | (section) 4 | (section) 16 | darker red. |
| Break against bone | (section) 8 | (section) 20 | (bone is red) light magenta. |
| Infection against bone | (section) 7 | (section) 19 | (bone is red) light magenta. |
| Infection against flesh | (section) 7 | (section) 19 | (flesh is light magenta) lighter magenta with tinge of blue or violet. |

Variation of the fluorescent elements in the screen may vary the resultant colors produced with the use of the fluorescent intensifying screen in dependence upon their fluorescent color values when excited by non-visible radiant energy such as X-rays or gamma rays. The images may be formed merely by the fluorescence of such screens or by the combination of fluorescence and the X-rays or gamma rays, or both, for example. The relative density of the different colors and color values is the same as set forth for FIGURES 1 and 4, preceding. Fluorescent elements may also be included in the film structure.

Referring to FIGURES 7 to 9 these are similar to FIGURES 4–6 except that one of the emulsions has been placed on the back of the film to speed up development. Thus the emulsion layers in FIGURE 8, 35, 36 and 38 correspond respectively with layers 21, 22 and 24 in FIGURE 5, the base is shown at 37 as a clear, colorless base and a masking layer 23 is shown between emulsion layers 35 and 36. In this case exposure to X-rays was carried out using a fluorescent intensifying screen and somewhat similar results obtained as those set forth above in FIGURE 4. The background 27 in this instance appears as a dark blue, the flesh 29 as magneta, the bone 31 as dark red with a very slight tint of magenta. The glass 28 against the background of plain blue is slightly magenta. The glass 30 against the background of the flesh is a magenta. The glass 32 in the bone appears almost an actual darker red against the magentish-red of the bone 31. The differentiation is in tones of color. The break at 34 appears as a light magenta against the dark red of the bone. The area of infection 33 in the flesh and the bone appears in the flesh as a somewhat lighter magenta with a tinge of blue than the light magenta of the flesh while in the bone it appears as a brighter or darker red than that of the bone per se.

In FIGURES 10–12 a film is used which omits the masking layer and has been exposed to X-rays without the use of a fluorescent screen. Here as shown in FIGURE 11, the emulsion layers 47, 48 and 50 correspond respectively with layers 9, 10, and 11 of the film used in FIGURE 1, the base 49 corresponding with base 12 in FIGURE 1. The results obtained on exposure without a fluorescent screen illustrated in FIGURE 10 and the legends of FIGURE 12 are comparable with those obtained using the film of FIGURE 1 as explained above except that since the masking layer has been omitted, the density of color is not as great, but the color values obtained and indicated by the legends 39 to 46 inclusive are the same color values as obtained at comparable points or areas in FIGURE 1 shown there in FIGURE 3 by the legends 1 to 8 inclusive and explained above.

It has been pointed out above that the present invention is not concerned with the reproduction of the true colors of the object or material being viewed but instead is concerned with the use of color to accentuate structural differentiation in the article or material being X-rayed. Consequently in carrying out the present invention it is not necessary to use composite emulsions or standard processing techniques which will result in natural color effects. And accordingly it becomes possible in the present invention to use very much more simplified films and processing solutions and methods in the production of color radiographs. This is illustrated in FIGURES 13 to 24. As shown in FIGURE 14, a two emulsion film is used with a colorless base. The base 60 carries emulsions 59 and 61 which develop to yellow and blue respectively. On exposure and development, there is obtained the radiograph illustrated in FIGURE 13 and corresponding legends of FIGURE 15 where the background 51 is bright green. For preferred purposes, one of the colors 59 or 61 should be stronger than the other. Thus if the yellow is the brighter, the background 51 will be bluish-green or greenish-blue. The flesh at 53 appears as a yellowish-green, the bone at 55 appears rather yellowish with a slight tint of green. The glass at 52 against the green background 51 appears as a brighter green; the glass 54 in the flesh portion appears as approximately the same shade as the bone against the flesh; while the glass in the bone at 56 appears as a yellow with a slight tinge of green. The break at 58 appears as a yellowish-green against the yellow of the bone 55. The infection area 57 appears as a brighter yellowish-green in the bone area and as a brighter green color value against the yellowish-green of the flesh in the flesh area.

In FIGURES 16 to 18 a film similar to that of FIGURE 14 was employed in that in FIGURE 17 the emulsion layers 70 and 73 correspond with emulsion layers 59 and 61 of FIGURE 14 and the base 72 of FIGURE 17 corresponds with the base 60 of FIGURE 14 but in FIGURE 17 a masking layer 71 has been included with the result that the additional silver gives added depth and density to the colors. The legends 62 to 69 inclusive of FIGURE 17 correspond respectively with legends 51 to 58 of FIGURE 15.

In FIGURES 19-21, a film is used which contains intermingled in its color layers elements of any of the numerous standard X-ray films now available thus as shown in FIGURE 20, 82 and 83, being identical with 86 are multiple layers of any standard X-ray emulsion containing also elements to form the color values of yellow, 85 is a masking layer that would retain a chromatic or neutral grey image after the film is processed. The base 84 is blue-green or cyan that is not too dense or dark and in proper depth to emphasize the yellow. Thus the finished film as shown in FIGURE 19 with the legends of FIGURE 21, would show values of blue-green or cyan for the background 74, 75 the glass against the background would be green, and the flesh 76 against the background would also be green, while the glass against the flesh 77 would have a color value of light green; the bone 78 would be a pale green almost yellow, while the glass against the bone 79 would be yellow with a very slight touch of green; the break 81 would appear as green against the yellowish-pale green of the bone. The infection in the bone 80 would show as light green against the yellowish-pale green of the bone, while the infection in the flesh 80 would show as a green against light green of the flesh.

FIGURES 22-24 are cross-sections through film that has color producing elements intermingled in the layers of any standard X-ray film or emulsion now available. 95 and 98 are identical, having incorporated in them the elements to form the color medium dark magenta, 96 and 99 are identical having incorporated, in smaller quantity in them the elements to form the color yellow. The base of this film 97 is also yellow in color. This film is not reversible. Thus as shown in FIGURE 22 with legends of FIGURE 24, the bone 91 would appear as yellow with a very slight tint of red. The infection in the bone 93 would appear as a red color value against the yellow of the bone, while the glass against the bone 92 would appear as a brighter yellow with almost no red in it. The flesh 89 would appear as a red with a slight tint of yellow, while the background 87 would appear as bright red. The glass against the background would appear as a lighter red with a slight tint of yellow against the background of red. The infection against the flesh would appear as red against the lighter red with a slight tint of yellow. The break in the bone 94 would appear as red with a little yellow against the yellow with a slight tint of red. Thus the contrasting color values ranging from yellow to red would appear.

FIGURES 25-36 are somewhat similar to FIGS. 1-24 with the exception that it is shown that different types of emulsions can produce similar results. Also further illustrating some of the additional different types of emulsions and film bases that can be used, FIGURES 25-36 show film structures and types of multi-colored contrast that can be obtained in the resultant developed color images by films that contained a color producing reversible type emulsion on one side and another color-non-reversible type on the other side; also illustrating films and non-reversible type emulsions that produce multi-colored images by development in a similar manner to "Kodacolor" and "Ektacolor" with the exception that such films and previously mentioned films and emulsions need not have filtering or responsive reactive elements for visible radiation for true or approximately true color rendition of visible light, but retain only an X-ray responsive or sensitive emulsion and elements necessary for production of color effects in the radiographic film during processing.

FIGURES 25 to 30 illustrate similar contrasting image results obtained by various types of color producing emulsions where the emulsion on one side is non-reversible and the emulsion on the other side is reversible. FIGURES 26 and 32 contain the legends that indicate color contrast of the multi-colored images in FIGURES 25 and 31. FIGURES 25 and 31 being similar to previous descriptions of a radiograph of a finger with glass intrusion and infection. FIGURES 31 to 36 illustrate similar contrasting image results obtained by various types of color producing emulsions where the emulsion on both sides is non-reversible or reversible.

FIGURE 27, item 109 is a split film base so that each emulsion can be processed separately if desired. Registration marks in addition to identical film size may be used to bring both emulsions into proper register. 108 contains a silver chloride and elements to form a single color image in direct proportion to the amount of silver chloride affected by the radiation. 110 contains silver halide and elements to form a different single color image in contra-relation to the amount of silver halide affected by the radiation. Each emulsion layer may be a single layer or a multiplicity of layers of the same emulsion.

In FIGURE 28, item 111 indicates six emulsion layers of silver chloride, silver bromide, silver halide, silver bromide, silver chloride, and silver halide respectively, each having incorporated therein color forming elements to produce yellow, magenta, cyan, magenta, yellow, and cyan respectively, the yellow layer being one unit in thickness, the magenta layer being two units in thickness, and the cyan layer being three units in thickness, 112 is a laminated film support having either in the outer layer or the center layer an element that fluoresces or irridesces under visible light. 113 is a reversible emulsion containing a multiplicity of layers of X-ray sensitive silver elements that would bleach out and leave a reversed yellow image in the areas in which the X-ray sensitive element was not affected by radiation.

FIGURES 29 and 30 are lenticulated, grooved, embossed, or engraved films to produce a greater effect of depth upon viewing. 115 is a clear or uniformly tinted film base. 114 contains a silver halide or non-screen emulsion that will produce a cyan image upon development. 116 contains a multiplicity of fine grain silver halide that will leave a magenta image in the areas in which the silver halide has not been affected by radiation. 117 contains a mixed grain size emulsion of silver halide that will yield a yellow image in conjunction with the sensitive silver elements affected by radiation. 118 is similar to 112 except that a light uniform yellow tint has been added. 119 is a similarly mixed grain emulsion as in 117, with the exception that it will yield a reversible image in cyan, the cyan dye image being in contra-relation or contra-proportion to or relation to the amount of silver that has been affected, and the emulsion areas not affected by reacted silver remaining uncolored or colored only in direct proportion or relation to the amount of sensitive emulsion affected by radiation.

In FIGURE 33, item 129 is the film base or emulsion carrier consisting of four laminated layers, where the two outer layers contain elements that fluoresce or become irridescent when exposed to X-rays, but are otherwise transparent or translucent to visible radiation. The two inner layers consist of a uniformly tinted or colored layer, for example, light red or pink, and a layer containing elements that will fluoresce or become irridescent when exposed to X-rays, but are otherwise transparent or translucent to visible radiation. The two inner layers may also consist of a uniformly tinted or colored layer, for example, light red or pink, and a layer containing elements that will fluoresce or become irridescent in visible or under ultra-violet to simplify viewing and reading the radiograph. Another aid in reading the radiographs is indicated by the peculiarities of some of the elements used to form the colored images in that some of these dyes will fluoresce or become irridescent in different colors or in similar colors as they appear under normal visible light conditions for reading radiographs. 128 and 130 produce color images in proportion to the amount of reaction that takes place in the sensitive elements of the emulsion when exposed to X-radiation and developed. 128 has a single layer or multiplicity of layers of X-ray sensitive emulsions that consists of large grains or molecules of basic X-ray responsive elements that have incorporated with them the elements to form a cyan image. Emulsion 130 has a single layer or multiplicity of layers of very fine grain X-ray responsive elements that have incorporated with them in the elements to form a yellow image. The difference in grain size of the X-ray sensitive and responsive elements and the number of layers, or the difference in the number of layers of each emulsion, showing a varying response to differences in the different portions of the X-ray spectrum or to differences in transmitted energy in the same portion of the X-ray spectrum.

In FIGURE 34, item 132 is the film base and has grained surfaces that permit better emulsion adhesion and the effect of semi-translucency when the emulsion surfaces are also grained. 131 and 132 also having grained emulsion surfaces to permit easy writing or marking on the surface. The film base 132 has incorporated therein a uniform tint of yellow and elements that fluoresce or become irridescent when exposed to visible radiation or ultra-violet, to permit easier reading of the multi-color radiograph. 131 is a multiplicity of layers of a very fine grain X-ray responsive emulsion that has contained therein the elements to form a non-reversible cyan image. 133 has about the same number of layers of a chemically different fine grain X-ray sensitive element or component than the one used in 131, and has also incorporated in the emulsion the elements to form a non-reversible magenta image. The X-ray sensitive elements in 131 showing a greater reatcion to the longer portion of the X-ray spectrum, while the elements in 133 show a greater reaction to the shorter portion of the X-ray spectrum. Such reactions can be further differentiated by the multiplicity of layers of each emulsions, the differences being shown in the multi-colored images in the finished radiographs.

FIGURE 35 is similar to FIGURES 29 and 30 in that the film base 135 and/or emulsion is lenticulated, engraved, grooved, or embossed to aid in rendering what appears to be a pseudo-sterospopic effect in the radiograph. The film base has a uniform light yellow tint. Both emulsions 134 and 136 are reversible. 134 has a multiplicity of fine grain emulsion layers that have incorporated in them the elements to produce an image in red by the long and longer medium portions of the X-ray spectrum because the sensitive elements were selected that showed the greatest reaction to this portion of the spectrum. 136 has a multiplicity of large grain emulsion layers that were selected because of their greater reaction to the short and shorter medium portions of the X-ray spectrum. 136 has inclined in it the elements to develop a blue image.

FIGURE 36 is a simple non-reversible type film for multi-color radiography. The film base, 138 is light magenta and contains elements that fluoresce when excited by X-radiation, and also may contain other elements that fluoresce or become irridescent in visible light to aid in reading the radiograph. Fluorescent elements in the film base include components that fluoresce yellow or greenish yellow when excited by the shorter and/or greatest mass of radiation and other elements, the fluorescent blue when excited by the longer portions of X-radiation or by the smallest or least intense mass of radiation. The emulsion 137 contains a metallic salt or combination of other metallic and silver salts, of proper grain size, that have been selected because of their greatest reaction to the shorter portions of the X-ray spectrum after they have been properly sensitized. This emulsion 137 is also especially sensitive to the visible yellow portion of the spectrum and is capable of or contains other elements capable of producing a bright yellow image. Emulsion 139 contains a metallic salt or combination of other metallic and silver salts of proper grain size that have been selected because of their greatest reaction to the longer portions of the X-ray spectrum after they have been properly sensitized. This emulsion, 139, is also especially sensitive to the visible blue portion of the spectrum and is capable of, or contains elements capable of producing a bright cyan image.

FIGURES 37–52 may be stated in general to show cross-sections of films and emulsions similar to the films and emulsions previously mentioned with the addition of and/or incorporation of a diaphragm or grid that may be transparent, semi-transparent or opaque to visible radiations but which is opaque or semi-opaque to X-radiation and is incorporated in the film. Plan views adjacent to each film cross section illustrate some of the different plan view forms that such diaphragms or grids may take, such grids or diaphragms being useful in normal black and white or multicolor radiography to reduce or eliminate scatter within the film or emulsions in principle similar to the Bucky diaphragm. Such grids or diaphragms are especially useful in producing stereoradiographs, which may be produced in black and white or multicolor effects, and which can be viewed without glasses or special equipment in much the same manner as lenticulated, grooved, embossed, or engraved stereographic films or plates for visible radiations that provide a three dimensional effect without glasses or special viewing equipment. Lenticulation, grooving, embossing, and engraved films are also shown as added features in viewing stereo-radiographs, or multicolor radiographs, or multicolor stereo-radiographs.

FIGURES 37 to 52 inclusive thus pertain to the use of a diaphragm, baffle or grid within the film to enable the film to be used for stereo-radiography when exposed to radiation from two or more source directions. Such exposures can be made simultaneously from two or more energy producing units or sources. The films illustrated in FIGURES 37, 39, 41, 43, 45, 47, 49 and 51 may be any of the types of films, including emulsions, mentioned in this application, or any other radiographic films, whether color or black and white, showing the grids in various positions in the emulsions and/or film base. The same grids or diaphragms, or baffles would also produce the side scatter effect within the emulsion in much the same manner that the Bucky diaphragm is used when interposed between the film and the energy source. Films that include within them such diaphragms, grids or baffles, hereinafter referred to as grids, may also be used with a Bucky diaphragm to further reduce emulsion surface effect by scattered energy. Such grid containing films may also be used with single energy sources or origins. FIGURES 38, 40, 42, 44, 46, 48, 50, 52 represent some of the various types of plan views that may be used. Spacing between the elements is determined or selected in accordance with the type of radiography being utilized, type of grid selected, etc. Proper spacing renders the impression of the subject image in third dimension, when the finished radiograph is viewed.

Although the positioning within the film emulsion cross-section is represented by straight lines, the actual cross-section of each individual grid or baffle may be elliptical, semi-elliptical, round, flat and/or very thin with or without sharp edges, concave-convex, slightly wedge shaped, etc. Such grids, diaphragms or baffles may be made from metal, plastic, glass, fiber-glass or fibrous plastic, wood, rubber, or any other appropriate material. These grids or baffles may be opaque, semi-opaque, translucent, semi-translucent, or semi-transparent to visible light for proper rendition of the three dimensional effect when viewing the radiograph. They may be transparent to visible light also, especially when used in films to be used with single direction X-ray energy sources; however, to achieve the proper effect these grids should preferably be opaque to X-radiation, but may also be semi-opaque, translucent, or semi-translucent, or semi-transparent to X-radiation or similar types of energy. When such grids are made of other elements than selected metals, for example, certain plastics, or rubber, the grids should contain therein, or be coated with, the necessary elements to make them more opaque or opaque to X-radiation.

FIGURES 53–72 illustrate response and results in various types of films and emulsions and results of various processing techniques in relation to a densitometric wedge at the top of each column. Each densitometric wedge represents variations in wave length of X-radiation or variation in transmission through a densitometric body of X-radiation or both in relation to the effect of the energy on a responsive emulsion. Thus each wedge is shown in reverse of the density of the body. The effect on the responsive emulsion is shown and also the manner in which such emulsions produce color and multicolor effects in the emulsions of the film as an entity. Variations in emulsion sensitivity to the transmitted X-radiation and variations in differently colored emulsions are also illustrated.

FIGURES 53 to 72 illustrate some of the various steps involved in producing multicolor radiographs in relation to the reactions that take place or are caused within the various or specific emulsions by variations in emulsion sensitivity or reaction to various wave lengths and/or intensity of energy transmitted by varying densitometric bodies or materials.

FIGURES 53, 58, 63 and 68 are densitometric wedges that represent variations in effects of energy reaction in the sensitive emulsions in direct proportion to the emulsion materials affected. Thus 175, 198, 221 and 238 indicate the greater amount of energy with little or no absorption by the subject, and 179, 202, 225, and 242 represent the lesser amount of energy or with greater absorption of energy by the subject. The different types of symbols representing the different wave lengths of X-radiation or similar energy, being applicable to all of the various types of emulsions.

In FIGURES 54, 55, 56, 59, 60 and 61, items 181, 183, 186, 188, 191, 193, 204, 206, 209, 211, 214, and 216 are masking layers for the following pertinent examples.

FIGURES 54, 55, 56 and 57 represent structures resulting from multicolor radiographs where the colored image is formed in direct relation to the amount of sensitive element affected by the radiation. In FIG. 54, 180 and 184 are the emulsion layers after initial development showing the formed colored image, for example, red in relation to the reaction in the emulsion, 182 and 187 being identical for this example, uniformly tinted pale green film bases. FIGURE 55 is the finished radiograph.

Layers 185 and 189 (FIG. 55) under 179 (FIG. 53) being extremely weak in red coloring, permit the color of the pale green film base to the predominant. Layers 185 and 189, under 175 in FIG. 53 have strong red or magenta images that predominate over the cyan film base. Thus the images in the finished multicolor radiograph appear in a range including a color predominantly pale green, brown or tan, and magenta. The uniform pale green color of the film base was equal to that formed by an 80 percent yellow dye and 40 percent blue dye. The resultant image formed in FIG. 55 under 175 of FIG. 53 was equal to the color formed by the addition of 95% red to the film base, forming an image in magenta. Under 177, of FIG. 53, FIG. 55 yielded a colored image equal to the addition of 60% red to the film base forming a brown or tan image. Under 179 of FIG. 53, FIG. 55 yielded an image equal to the addition of 10% red or less forming a predominantly green or dull tarnish green image.

In FIG. 56 the film is similar to FIGURES 54 and 55 with the exception that emulsion 190 is sensitive to the full range of the spectrum wedge, while emulsion 194 is predominantly sensitive to the longer radiations. Neither emulsion has any color forming elements included within it (such as dye couplers, etc.) but are of a type that form the colored images by primary color developments, chemical toning, or dye toning processes. The resultant images were in slightly greater range of the contrasting colors previously mentioned.

FIG. 57 is similar to FIG. 56 with the exception that emulsion 195 yields a differently colored image than 197 in processing, the difference in color or color tones in two emulsions caused by a single processing compound being due to the difference in the types of silver halides, grain size, and sensitivity of each emulsion. This process may also follow a procedure similar to that revealed by Gaspar in U.S. Patent 1,956,122, with the exception that the film base would carry a light uniform tint of a color that adds greater contrasting colors in the multi-color radiograph. Another variation of producing a multicolor radiograph from emulsions 195 and 197 is to prepare these emulsions in a manner similar to the one previously mentioned so that they respond in varying colors or color tones that contrast to the light uniform tint in the film. Contrast can be further increased when a pinatype dye is used (of the same color as the tint or of a color that contrasts the uniform tint and the toned images), to color the remaining gelatinous mass in contra-proportion to the colored or toned images, to further increase the contrasting colors and tones in the multicolor radiograph.

In the examples given for FIGURES 56 and 57, the emulsions consist of a multiplicity of X-ray sensitive layers and may include uniform or contrasting tint and/or fluorescent elements in the film base that make such film impractical for visible light photography.

FIGURES 59 to 61 are multicolor radiograph that has a reversible or reversed image on one side and a non-versible image on the other side. Thus emulsions 203 has a developed color image in direct proportion to the amount of sensitive element affected by the radiation. Emulsion 207 has an image of a color complementary to or contrasting to the color in emulsion 203. The color image in emulsion 207 is in contra-proportion to the amount of X-ray sensitive elements affected by the radiation. In FIG. 60, emulsions 208 and 212 are respectively the same as emulsions 203 and 207 and are shown without the reaction caused upon exposure to radiation. In FIGURE 61, the emulsions 213 and 217 are respectively the same as the emulsions 208 and 212 but indicate greater color contrast because emulsion 213 has been made more sensitive to the X-radiation range represented by 198 to 201 in FIGURE 58, and emulsion 217 is more sensitive to the range represented by 199 to 202.

In FIGURE 62, emulsion 218 is of a color contrasting or complementary to emulsion 220. Emulsion 218 shows marked sensitivity to the X-ray radiation range represented by 198 to 200, and emulsion 220 to the range represented by 200 to 202. Film base 219 contains a uniform tint that contrasts both colored images, to make a multicolor radiograph in a range of contrasting colors and color tones based on three contrasting colors.

FIGURES 64, 65, 66 and 67 represent a reversal type film that produces color images in a manner similar to "Kodachrome," or "Ektachrome," or "Ansco" color film, etc. with the exception that the films represented herein have only two X-ray sensitive color producing emulsion layers instead of the three color producing emulsion layers used for color photography by visible light. FIGURE 64 indicates the amount of X-ray sensitive emulsion elements affected by the radiation. Both emulsions 226 and 228 show a reaction to the full range of radiation. The colored images are formed within both emulsions in contra-proportion to the amount of X-ray sensitive emulsion elements affected by radiation. In FIGURE 65, the colored images are formed, and FIG. 66 shows the emulsions with the X-ray sensitive emulsions bleached out or removed. Emulsion layers 226, 229, 232, had incorporated the necessary elements to permit the forming of very dense image in a color equivalent to 80% red or magenta in its densest portion. The film base was tinted a uniform tint equivalent to 80% yellow. Emulsion layers 228, 231 and 234 produced a light or generally weak cyan or blue image equal to 80% blue in its densest portion because of the nature of the elements incorporated in these emulsion layers and the type of processing used. The difference in color ranges appearing in the final radiograph ran from purple or violet in FIG. 66 under 225 of FIG. 63, to a predominantly red image with a slightly pale green cast forming a bright brownish red. Intermediate colors included purple and brown or tan images. This particular technique is interesting and useful when the film base contains elements that fluoresce for example, in a bright yellow color, when exposed to ultra-violet light or other combined or individual portions of the spectrum. Keeping the red image between the ultra-violet projector and the viewer, permits the greatest fluorescence in areas where there is the least red. Reversing the film so that the blue image is between the viewer and the ultra-violet projector permits greater areas of fluorescence and a viewed image in yellow and red. FIG. 67 represents a film that is similar to the one described for FIGURES 64, 65, and 66 with the exception that emulsion 235 has a balanced sensitivity to the full range of the X-ray spectrum but a weak response to the energy represented by 225 of FIG. 63, thus showing the greatest color strength for this emulsion under 225. Emulsion 237 has a balanced sensitivity to the full range of the X-ray spectrum with the exception that it responds intensely to the radiation represented by 221 of FIG. 63 thus eliminating any color formation in this area upon reversal of the film. This slight shift in emulsion reaction to X-radiation caused even greater contrast in the resultant images.

FIGURES 69 and 70 represent films that develop color images in direct relation to the amount of reaction that takes place in the emulsion upon exposure to X-radiation, FIG. 69 showing the developed color and X-ray emulsion elements and FIG. 70 showing the finished multicolor radiograph. For example, emulsions 243, 247, 250 and 254 are predominantly sensitive to the short portions of the X-ray spectrum, emulsions 244, 248, 251, and 255 to the medium portions of the X-ray spectrum, and emulsions 245, 249, 252, and 256 to the long portions of the X-ray spectrum. In this example the film is constructed to permit emulsion 243 (250) to receive the energy first or emulsion 249 (256) to receive the energy first when the film is turned upside down, a difference in result being achieved by secondary energy or particles given off by the different X-ray sensitive and reactive elements within the emulsion structure. Tests indicate that total absorption is not needed to obtain excellent multicolor radiographs, and that it is not achieved. Sufficient energy passed through the subject and the light-tight cassette containing this film to make a good fluoroscopic image on an ordinary fluoroscopic screen of the type in use by numerous physicians. The emulsions may be made in a manner to produce any selection of colors, but for this example, 250 and 254 yield magenta images, 251 and 255 yield yellow images, and 252 and 256 yield cyan images. Note that the arrangement of emulsion layers makes this film unfit for color photography by visible light, but this arrangement does produce multicolor radiographs in a wide range of various colors.

FIGURE 71 is a film similar to FIGURES 69 and 70 except that only to differently colored and differently sensitive emulsions are used on each side.

FIGURE 72 is a film structure similar to FIGURE 71 with the exception the emulsions are reversible to form multicolor images.

On the final page of drawings are two sets of figures including FIGURES 73–82 inclusive, hereinafter, referred to as the "first set,' and FIGURES 83–92 inclusive, hereinafter referred to as the "second set." Both sets of figures have similar densitometric wedges; however in this case, these wedges are shown in relation to the density of a transmitting body instead of their reaction in a responsive emulsion and may also represent different wave lengths of energy. The "first set" of figures represents or is an analysis of a multi-color radiographic film that has a non-reversible color producing emulsion in the upper layer, and a reversible color producing emulsion in the lower layer, showing variations to X-ray wave length and/or densitometric sensitivity in direct relation to, or complementary to the amount of a given color that will be deposited in the emulsion in relation to or contra-relation to the amount of or depth of the silver that reacted to the X-radiation. The lower line of figures in the first set represents a summary of the resultant colors produced in the radiograph by the differently colored emulsions. With the use of a reversible emulsion on one side and a non-reversible emulsion on the other side, the exposure latitude of the multi-color radiographic film is greatly increased. In the "second set" of figures, the densitometric wedge is the same as that for the first set of figures, but the remaining wedges in this second set of figures show variable densitometric and/or wave length reactions in the emulsion when both the upper and lower emulsions are reversible. The lower line of figures in this second set of figures represents the resultant colors in a multi-color radiograph from variously colored emulsions or from similarly colored emulsions in conjunction with a uniformly colored emulsion carrier or film base. The lower line of figures in both sets of figures also represents vari-colored effects in multicolored radiographs when a uniformly colored emulsion carrier or film base is used in conjunction with variously colored emulsions in the multicolored emulsions in the multicolored radiographic film.

FIGURES 73 and 83 are densitometric wedges that represent the densities of material through which radiation passes, and also the quantity or nature of the wave lengths of radiation reaching the X-ray sensitive emulsion. Items 324 and 331 represent the shorter full transmission or the greatest mass of radiation from the source equal to 100%, items 330 and 337 represent total obstruction to radiation equal to 0% transmission, items 327 and 334 representing approximately 50% transmission of radiation, etc. These wedges are also used for differences in the effect of radiation when transmitted by two subjects with equal absorptive ratios in relation to each subject having black and white radiographic film, but with different transmission qualities due to differences in molecular or atomic structure.

FIGURES 74 to 82 represent films with a reversible color producing emulsion on one side and a non-reversible color producing emulsion on the other side.

FIGURES 74, 77 and 80 represent a non-reversible emulsion, items 272, 291 and 310 being the amount of the sensitive emulsion or silver halide, etc. affected by exposure and the color being formed by the amount of sensitive materials affected by radiation. Items 273, 292 and 311 are wedges representing the amount of color in the developed image. FIGURES 75, 78, 91 represent reversible emulsions with the color being formed in contra-relation to the amount of sensitive emulsion or silver halide, etc. affected by the radiation. FIGURES 76, 79 and 82 represent the resultant multicolor images in the finished radiograph. This "first set" of figures shows also the amount of color variation that can take place by exposure and development variation in films having a reversible emulsion on one side and a non-reversible emulsion on the other.

FIGURES 83 to 92 represent reversible or non-reversible emulsions with both sides of the film having a similar type of emulsion. FIGURES 86, 89 and 92 representing resultant multicolor images in the finished radiograph. Variations in emulsions sensitivity to various portions of the X-ray spectrum are also indicated.

For this example, with FIGURES 77, 78 and 79, the film base was lightly tinted with a transparent color equivalent to 80% yellow. Emulsion 77 would develop or produce a red or magenta image and emulsion 79 would produce a cyan or blue image. 290 having an image equivalent to 20% red and 297 having an image equivalent to 80% blue, furnishes a final image in 304 approximately equivalent to a brownish blue. 286 being 100% red plus 293—colorless, equals to a bright red image in 300. 288 is equal to 60% red, plus 295 equals to 40% blue, furnish a brown or tan image in 302. In this example both emulsions had a full range of sensitivity. Variation in sensitivity to different positions of the X-ray spectrum, increase image contrast by color and color tones in the final radiograph by showing some portions of the image with the additional color or color tone of green.

For this example, FIGURES 90 and 91 represent non-reversible emulsion on a film base that has been tinted a bright luminescent but transparent magenta or red. FIGURE 90 yields a cyan image. Thus 376—80% cyan, plus 100% yellow plus the tinted base, equal to a green with a slightly brown tint in 390. 378—40% cyan, plus 385—60% yellow produce in 392, a brownish color with a slight tint of green. 380-colorless plus 387—20% yellow, plus the magenta film base produce a bright red or yellow tinted, magenta in 394.

For this example, FIGURES 87 and 88 produce cyan images on a magenta film base. 357 and 364 produce a predominant cyan with a slightly purplish tinge in 371. 361 and 368 being weak in cyan, permit the magenta of the film base to predominate. Intermediate variations of blue are produced by the subtractive synthesis of magenta and cyan. Thus a multicolor radiograph in greenish-blue or cyan, or purplish blue, and magenta is formed by a colored or tinted film base and emulsions that produce a color complementary to the film base tint. For the example given above, use of a pinatype dye further varies the range of colors or color contrast in the multicolor radiograph. Further variance in multicolor contrast can be obtained by selecting emulsions that have tendencies toward predominant sensitivities at opposite ends of the X-ray spectrum.

In connection with any of the illustrated films shown above it should be pointed out that the emulsions employed can be of any of the types utilized in color photography including dye coupling, developer, diazo, etc., or they may have incorporated therein an inherent dye which appears upon development, or in conjunction with an X-ray film or X-ray film emulsion elements. Since no actual filtration of visible color is necessary, and therefore, no color filter layers of the type used for color photography with the visible light are necessary, the order in which the emulsions are placed upon the base need be considered only in the light of the type of developer to be used and the results desired. Thus the type of developer may be that which will attack the first emulsion first, and the succeeding emulsions may be developed in order, or all emulsions may be color developed simultaneously.

The above examples and illustrations are intended to exemplify the instrumentalities, techniques, and methods that may be utilized in carrying out the present invention but illustrate but a few of the various ways in which the results of the present invention may be accomplished. Thus the colors and color combinations in the examples and illustrations given above may be varied in any desired way and any combination of color values employed. If desired the radiographs containing color developed images may also be subjected to further toning operations or the use of variable toning or color forming processing baths, but this is not essential and would not be carried out unless special effects are sought, or unless a variable color forming emulsion or film was used.

The results obtained in accordance with the present invention by the utilization of X-rays, gamma rays, or other non-visible rays of the electro-magnetic spectrum, are markedly different from those obtained by the use of visible rays in photography. The results obtained by exposure to X-rays or similar form of radiant energy differentiate themselves from the effects of visible light in that X-rays and related rays produce effects which vary dependent on such factors as differences in atomic weights, differences in molecular structure and differences in thickness of layers, etc., as well as other phenomena associated with the use of radiant energy such as X-rays, etc. The energy transmitted by two different substances of different atomic weights, or of different molecular structure, or of different thickness, will vary and produce differences in effect, therefore, in radiographs produced in accordance with the present invention. Thus given two substances of different atomic weights or molecular structures but each having the same absorptive qualities of a given source of radiant energy such as X-rays, so that the transmitted energy will have the same intensity after passing through each substance or after being transmitted by said substance, the resultant energy after being so transmitted by each substance of different atomic weight or molecular structure while having the same intensity will show differences in wave length or in the quanta of which the particular energy consists which cause differentiation in the color values obtained in accordance with the present invention. Thus a change in wave length of the energy of a filtration of wave length by substances of different molecular structure or atomic weight is detectable with the use of color values; and even where such different substances transmit wave lengths of energy that are difficult to separate, changes in the quanta of the energy will take place that permit the differentiation by or with the use of color. In the event that a change in both wave length and quanta takes place, the results will also be separable by or with the use of color. So that even where the transmitted energy has the same intensity, a differentiation is obtainable; however, where the intensity of the transmitted energy varies also the contrast will be even greater. In instances where substances cannot be distinguished on prior art types of radiographic film, they can be distinguished on radiographs produced in accordance with the present invention. Thus where radiographs were taken to differentiate pieces, particles and slivers of non-metallic glass, by the use of differences in color values developed in accordance with the present invention, where the glass was indistinguishable or hardly detectable in prior art types of radiographs, the color values or hue brought out and differentiated the glass, as for example, from the bone. Thus the differences in wave lengths, or quanta, or intensity can be differentiated in various manners, the type of differentiation desired or required being dependent upon the molecular or atomic structure of the films and emulsions or the solutions and baths being used to bring out the differentiation, all of which result in variance or change in the energy which is detectable on the color radiographs.

Striking results are obtained in cases where there is little differentiation in prior art radiographs. In for example, bone pathology that is weak on ordinary or tinted films of the prior art, a very clear differentiation is obtained on the radiographs produced in accordance with the present invention since the differences become clearly defined in color values or differences in color. In accordance with the present invention, therefore, it is preferred to use at least two colors in the emulsions as illustrated in FIGURE 14 above but various combinations may be employed, as for example, where a tinted base is employed together with a single emulsion producing a developed color or where two sensitive emulsions are employed, one of which produces the black and whites or greys of the silver developed type whereas the other produces a color developed image.

Variations in the results obtained result from modifications of the instrumentalities, techniques and procedures employed in carrying out the present invention. Since we are dealing here with the effects produced by X-rays or similar radiant energy, it is possible to vary the effect obtained not alone by variation in the emulsion or development procedure, but also by modification of the energy which is transmitted to the film depending for example, on fluorescent screens, filters, etc., and the nature of such screens and filters. As has been indicated above, fluorescent intensifying screens may produce a marked difference in the color values obtained. Further, the films, film emulsions, and film supports may have added to them individually or in any combination, fluorescent substances or radio-active substances that produce a modification of the color effect obtained. Or a radiolucent substance or paste containing a percentage as desired of radio-opaque or radiolucent substance or substances may be employed to modify the results obtained. Variation in the color values may also be secured by varying the atomic weights, or molecular size, or both, etc., of the substances used in preparing or manufacturing the film supports, film emulsions, or adhesives, or coatings employed in preparing such films; or such substances of variable atomic weights or variation of the distribution of the sensitive grain or molecule or both, may be used to vary the emulsion or the intensity of the radiant energy to obtain a variation in the color values. Substances of different atomic weights may be placed between the film emulsions, or the emulsion and the supports, or on the surfaces of the completed film, or be used as a separate filter element in conjunction with any of the other variations set forth above. Similar emulsion structures in different emulsion layers may have their sensitivity varied by numerous chemicals.

While multicolor radiographs have been particularly emphasized above, the present invention may be employed in combination with the usual gray type or normal silver type emulsions. Further, such gray type, black type, silver type, or silver halide type emulsions may be colorless or may have added or inherent in it a color, colorer, or a coloring agent, or a chemical agent to form color by immersion in solution or by chemical coupling or by the absorption of dyes. Such grey type, black type, or silver type, or silver halide emulsions, etc., may be used in combination with color elements or color layers. Numerous other elements, such as platinum, or other metallic salts, may be sensitized to react to X-radiation, and with a variation in reaction caused by the type or nature of the sensitizing chemicals being used. Further variation in sensitivity reaction may be obtained with an individual type of metallic salt that is varied in form such as chloride, chloride-bromide, iodide, or iodide-bromides, etc.

The type of cassette or film holder employed has an effect on the transmission values of the energy and variation in the results obtained may be affected by variation in the nature and character of the cassette or film holder applying the principles referred to above.

The instrumentalities themselves including the cassettes, color films, plates, etc., may be those which are available in the art or they may be materially modified from prior art practices. Thus the type of supports employed may be glass or plastic any any type of plastic ordinarily employed as the base support for films or emulsions or coatings may be utilized in this connection, particularly the cellulose esters and cellulose ethers including for example, cellulose acetate, cellulose nitrate, combinations thereof, etc., or the plastic may be of the type known as "Dyrite," or "Vinylite" or other vinyl plastics, polyethylene, etc. Single or laminated sheets of the support whether glass or plastic may be employed and the techniques in laminating the plastic sheets such as cellulose acetate or cellulose nitrate either in combination with each other or with other plastics such as "Dyrite" or "Vinylite" may be employed.

While in the past it has been the objective of film manufacturers to eliminate any fogginess effect which gives a veiled appearance in the finished negative, under some circumstances at least the effect of fogginess or of a veil has some advantages in connection with radiography so that this effect may actually be sought by specially treating the surfaces of the base to be coated or in any other way. Such special treatment may consist of for example, graining the surfaces, etching the surfaces, or creating a simulated etched or grained effect on the surface of the material to be used or within the material or substances used as by employing chemical compounds or substances, or materials or substances may be applied to the surface of the sheets of materials. The support may have its surface finely grooved either with parallel lines or lines which are at angles to each other or combinations of lines and angles as desired or the support surfaces may be lenticulated. To the extent that such surfaces are modified in this way, they may serve to secure better adhesion of coatings or emulsions applied thereto in addition to creating the fogginess or screened or veiled effect.

The color values produced in the radiograph in accordance with the present invention have an objective to supply additional detail and contrast. The color may, therefore, be of such type that it will not materially decrease the transmission of light in the process of viewing the finished product or it may be of the type that will be translucent and provide a definite limitation in the light transmission which is effected or it may provide the effect of subdued contrast so that faint tones and colorations will be visible. Or an impression of glowing or fluorescence may be produced. The dyes or coloring matter may be added directly to or included within the base material itself or may be included with the cement or substance used in the production of laminated supports or a sheet of colored or coated substances may be inserted between the materials when laminated, or the materials used as film supports or film bases can be treated or coated with a dye or coloring or colored colloidal substance.

These dyes may be used in any combination to produce any colored effect desired in order to obtain contrast with the image-color in the emulsion of the film. It may be pointed out that the base or support may be left clear or without any added dye or tint and coated instead with a photo-sensitive dye or emulsion that will produce the color contrast by reaction from exposure or development. Another means for producing colored base for additional contrast is to use a base or film support that has a permanent tint or color added to or in it and then using a similar photo-sensitive coloring or tint in the emulsion or emulsions to produce the effect of increased color density or tint density, but it is noted that this is a permanent tinting effect and is to be distinguished from the development of a color image in an emulsion.

A laminated film base or laminated film support may desirably be produced to provide greater strength, absence of curling, less shrinkage or expansion during processing, and less temperature coefficient of change then is experienced with prior art types of films and supports, making such laminated bases or supports particularly valuable in the production of films for scientific and engineering studies as a radiology, area-photography, photomicroscopy, and other photogrammetric work, etc.

If a permanently colored base is to be produced, any of the dyes or coloring matters referred to above may be utilized to color one or more of the laminated layers or a fluorescent material may be incorporated within such layers including for example, such fluorescent materials as uranine (fluorescein), yangonin, etc.

The surfaces of the laminations may be grained or lenticulated or treated as set forth above to produce greater adhesion between the layers, or an effect on the diffusion or diffraction of the light, or both.

It should be pointed out that when the action in the film is caused directly by the radiant energy such as X-rays, it is due to the action of the radiant energy on the emulsion or emulsions that contain in or that can have added to them a dye or dye coupler or other material that will supply the color desired in the finished or developed unit. While visible light may be used during the process of development or finishing of the radiographs produced in accordance with the present invention, such use of visible light subsequent to the exposure which in accordance with the present invention is made by X-rays or other non-visible portions of the electro-magnetic spectrum, is not to be treated as forming a part of the exposure operation. The use of visible light in this way during the process of development or finishing the radiograph, as for example, in connection with reversal or partial reversal of the image is quite distinct from the production of the image by the use of visual light. In the present invention the visible light is used not to create the initial or original image and is used only for chemical or secondary effect only nor is such use of visible light necessary in any of the developing processes unless special effects are sought.

Any of the X-ray films now available may have incorporated in them color elements to form images of more than one color value or tone, or any of the color films or film containing color elements can have added to them elements of any X-ray emulsion to make them more suitable for radiography producing radiographs containing more than one color value or tone.

As indicated above, any radiographic film or plate can be used modified as set forth above in accordance with the present invention. The usual type of radiographic film consists of a radio-sensitive emulsion produced from a colloidal suspension of one of the silver halides such as silver chloride, silver bromide or silver iodide. For example, such emulsions may be obtained by mixing a gelatinous solution of silver nitrate with potassium bromide (in the absence of light), silver bromide being produced by interreaction. The resulting milky emulsion is cooled to gel and the latter washed with water to remove soluble salts. It is then melted at a gentle heat and applied uniformly on both sides of the base material such as a sheet of cellulose acetate. When dry each layer of the emulsion should measure preferably about 25 microns in thickness but this is variable. Sensitivity of X-ray films may be increased by any number of sensitizers, for example uranine, eosin, erythrosin, quinoline red, rhodamine, etc., incorporated into the emulsion. Other types of sensitizers that may be incorporated include, for example, cyanine, methyl violet, nigrosine, dicyanin, neocyanine, etc. The latter influences speed or intensity of the response which is obtained.

It may be stated that X-rays of different frequencies and this is true of other portions of the non-visible electro-magnetic spectrum do not have an equal quantitive effect and while shorter wave lengths are desirably used for penetration of deep or thick parts of the body or for metallographic work. Greater density can be obtained by increasing the thickness of the layer of sensitive silver salts or alternatively or using a plurality of layers, or the silver halide content of the emulsion, etc. Or a multiplicity of layers of the silver salt containing sensitive emulsion may be applied on one or both sides of the base. The silver halides like silver bromide are the preferred sensitive salt commonly used but other heavy metal salts such as silver tungstate or salts of heavy metals themselves having a high molecular weight may be used in the sensitive layers for absorption of a greater amount of the radiation.

Introduction of intensifying screens is desirably employed such as a piece of cardboard or celluloid coated with a layer of artificial scheelite (calcium tungstate) which glows a brilliant blue to bluish-white under the influence of X-rays and materially intensifies the effect obtained. Other types of screens may similarly be employed in accordance with the usual X-ray technique. And intensifying screens may be used on both sides where the emulsion is placed on both sides. But as noted above, intensifying screens do not have to be employed. Where screens are employed, X-ray film may be used inside the sandwich of intensifying screens where the film carries a double coating.

Any of the X-ray films as set forth above may be employed for the purposes of the present invention by incorporating the materials which will develop color either into any of the sensitive layers containing the silver halide salts, or by supplying separate layers which will develop color in addition to the silver salt layers. The technique of natural color photography may be used in modifying the X-ray films for this purpose for use in accordance with the present invention.

The grain size in the X-ray film materially affects the characteristics of the final radiograph. While variations in grain size may be used to obtain a variable sensitometric reaction, a grain size of from 2 to 4 microns is most desirably used. Such film of that grain size may then be modified as set forth above by the incorporation of materials or layers which develop color or color images in one or more colors or color values by incorporation of such materials into the silver halide emulsions employed for such films or by the addition of separate sensitive layers containing such materials which develop color, as added layers on the normal or standard type X-ray film.

The photographic laminations of the present invention may be used in any field where standard X-ray films and subatomic particle tracking plates and films have heretofore been used. The results obtained in any such fields due to the production of color radiographs as taught herein give new techniques and facilities of the greatest and most fundamental importance in said fields, results apparent from the description given above. Thus, considering the fields of use of X-rays, the two main arts include industrial and medical applications. Industrially, applications of the invention include utilization in macromolecular and micromolecular fields among which may be mentioned quantitative analysis, radiography, microradiography, crystal analysis, e.g. X-ray crystallography, spectroscopy, etc. Medically, applications in radiography are particularly important. In addition, utilization as a tool or technique in research in any of the mentioned fields and in the study of sub-atomic particles and electromagnetic waves other than the visual spectrum are of great importance, as for example in tracking mesons, protons, neutrons, etc. and the effects of such particles on atoms of various elements. Applications in autoradiography, electron microscopy, etc. other additional utility.

In X-ray crystallography, it has been noticed that many of the standard types of black and white films now used for this purpose produce crystal formations of intermediate shades of grey, ranging from the dense black to portions that are clear or completely transparent to light. Use of a multi-color film having an emulsion of one atomic weight or sensitivity range on one side, and another emulsion of a complementary or contrasting color that has a different atomic weight or opposing range of sensitivity on the other side—may be used to produce crystallography patterns in a range of color tones or hues that permit the analysis of these patterns in relation to the atomic weight of, or the varying range of sensitivity of, the different emulsions in relation to the energy being used with respect to the subject crystals.

Thus in accordance with the present invention, film or plates giving a color radiograph may be used in lieu of standard X-ray film or plates in the production of Laue photographs, Weissenberg diagrams, X-ray powder photographs as by the Bragg or the Debye-Scherrer-Hull methods, etc. The techniques thus available are in no way limited to minerals and other inorganic substances but are applicable in the X-ray crystallography of organic compounds and structures.

With respect to utilization in tracking and effects of subatomic particles, the following may be noted. In films of neutron, meson, proton tracks, etc., it has also been noticed that similar types of varying gradations of grey also occur. In many instances, the tracks are so weak as to appear lost. Multi-color radiography eliminates many difficulties and gives new results by making it possible to determine the co-relationship of the particle or energy sources in relation to the atomic weights or sensitivity of the film or emulsions the various effects being shown in different colors for the different types of elements or sensitivities included in the film or emulsions. The multi-colored radiograph exposes many effects of these particles or sources or types of energy that are lost in black and white photography, differences in colors or color tones, appearing in relation to the sensitivity or atomic weight of the sensitive materials used in the emulsion.

In radiographic film structures or laminations set forth above, it has been found that inclusion of layers or elements that partially absorb some of the primary or secondary X-radiation enhance the results and contrasts in the finished radiograph. Total absorption of any one wave length or group of wave lengths is generally undesirable. In some circumstances, it may be desirable to absorb totally the secondary radiation and only partially absorb the primary radiation; in no case is it considered desirable to attempt to absorb the total radiation. Partial absorption of X-radiation as an aid in increasing the differentiation between the different wave lengths and intensities of X-radiation in the film structure or in the various layers or emulsions making up the film structure has been found to be very helpful in numerous instances; however, in many other instances, this technique has been found to be unnecessary. Such absorptive elements or layers may be interposed on or between, or within the film lamination, or within the silver halide containing gelatin layers. Such filtration or absorption techniques do not necessarily absorb, in totum, the whole of any single wave length or intensity of X-radiation, nor does the entire film absorb the entire radiation. Consequently, the cassettes containing the radiographic films herein described may desirably include a backing, such as lead sheeting or foil, to absorb the radiation that passes through the photographic lamination.

In films or other photographic laminations described herein, "polaroid" elements or layers within the film structure may be used to vary the contrast of the color when viewing the finished colored radiograph, particularly where a controllable "polaroid" unit is used between the radiograph and the light source. Another technique used in obtaining effects that are variable, is by the use of polaroid glasses that have controllable or rotatable elements. In the case of multi-color stereo-radiographs, one layer of one color may have the polarized element in opposition to the polarized element in the other layer of a contrasting or complementary color. The lower layer of the emulsion may be predominantly sensitive to the shorter wave lengths of radiation, or the radiation given off by 100 kv. in one X-ray projector. The other layer may be predominantly sensitive to the softer or longer wave lengths of radiation given off by the other X-ray projector at 50 kv. The finished radiograph in various colors thus has an image with a stereographic or stereogrammetric effect when viewed with polaroid glasses. Variations in technique such as modifications of the "Vectograph" for radiography or multi-color radiography are also very effective. Further modifications in varying the angularity of the opposing "polaroid" layers or elements also achieve excellent results. A single "polaroid" layer may also be used to control only one or two of the colors and as by using a "polaroid" film base to modify the uniform tint and the contrast in the contrasting colored images. The "polaroid" film base may also be used to modify the effects of the colored image on the opposite side of the film. A great many variations can be achieved by the use of polaroid elements in conjunction with color radiographs.

The utilization of a simplified photographic lamination as taught herein is particularly emphasized as where a base layer carries a silver halide emulsion containing a color producing material, on each side of the base layer. Such emulsions may be differentiated not alone by color but also in their sensitivity to particular sub-atomic particles. Thus the emulsion on one side may be ray sensitive to one type of ray, for example, beta rays, while another emulsion is made sensitive to for example, X-rays. Various combinations may be used and the base may be modified to serve further as a screen to insure non-passage of one type of ray through the lamination to the further emulsion. Such structures may also be made where no base is used and two or more silver halide emulsions with contrasting color development materials are placed one upon the other.

To differentiate ray-sensitive photo-graphic laminations particularly adapted for use with rays including sub-atomic particles and electromagnetic waves of wave length outside the visual spectrum, the laminations will be referred to as having a silver halide emulsion sensitive primarily to blue and violet only of the visual spectrum.

This application is a continuation-in-part of application Serial No. 10,655, filed February 25, 1948, now U.S. Patent No. 2,644,096, granted June 30, 1953.

Having thus set forth my invention, I claim:

1. A radiograph having a gelatin emulsion carrying a color developed radiographic image.
2. The radiograph of claim 1 which includes a layer providing a color value different from that of the gelatin emulsion.
3. The radiograph of claim 2 in which the layer color is a single permanent tint.
4. The radiograph of claim 2 in which the layer includes a color developed radiographic image the resultant effect being color differentiation of ray delineated structural features in subtractive color images.
5. The radiograph of claim 1 in which the gelatin emulsion is carried on a base.
6. The radiograph of claim 5 which includes a gelatin emulsion on each side of the base, each gelatin emulsion carrying a color developed radiographic image, the image being the same but the color being contrastingly different in the emulsions.
7. A photographic lamination for production of a radiograph having a developed color radiographic image, said lamination including a ray-responsive silver halide emulsion sensitized by dye to blue and violet of the visual spectrum, and containing a heavy metal salt to increase the response of said emulsion to said rays, said emulsion containing photographic color producing dye coupler material which yields color in the developed film, the color being in the visual portion of the spectrum and different from that of the sensitizer dye, the ray being selected from the group consisting of sub-atomic particles and electromagnetic waves of wave-length outside the visual spectrum, said lamination including a layer in addition to said emulsion which layer provides a contrasting color value different from that of the emulsion, the color of said layer being a permanent tint present in said layer before development.

References Cited in the file of this patent

UNITED STATES PATENTS

| | | |
|---|---|---|
| 2,159,600 | Murray et al. | May 23, 1939 |
| 2,168,183 | Wilmanns et al. | Aug. 1, 1939 |
| 2,224,329 | Wilmanns et al. | Dec. 10, 1940 |
| 2,230,590 | Eggert | Feb. 4, 1941 |
| 2,509,766 | Gross | May 30, 1950 |
| 2,644,096 | Fine | June 30, 1953 |

FOREIGN PATENTS

| | | |
|---|---|---|
| 276,678 | Great Britain | Nov. 3, 1927 |
| 626,979 | Great Britain | July 25, 1949 |
| 511,281 | Great Britain | Aug. 16, 1939 |
| 555,642 | Great Britain | Sept. 1, 1943 |
| 510,598 | Great Britain | July 31, 1939 |

OTHER REFERENCES

Color Photography, by Wheeler, The Pittman Press, Bath, 1929, pages 15 to 17.

Photography, Theory and Practice, by Clerc, The Pittman Press, Bath, 2nd edition, 1937, pages 544 and 545.